United States Patent [19]
Ito et al.

[11] 3,871,680
[45] Mar. 18, 1975

[54] VEHICLE SUSPENSION SYSTEM

[75] Inventors: Naganori Ito; Hiroshi Aikawa, both of Tokyo, Japan

[73] Assignee: Nissen Motor Company, Limited, Yokohama, Japan

[22] Filed: Mar. 22, 1973

[21] Appl. No.: 343,965

[30] Foreign Application Priority Data
Mar. 27, 1972 Japan.............................. 47-29702

[52] U.S. Cl............................ 280/124 F, 267/65 D
[51] Int. Cl............................................. B60g 17/04
[58] Field of Search..................... 280/124 F, 124 R; 267/65 R, 65 D, 122, 123

[56] References Cited
UNITED STATES PATENTS
2,895,744   7/1959   Jackson........................... 280/124 F
3,736,000   5/1973   Capgras........................... 280/124 F Primary Examiner—David Schonberg
Assistant Examiner—John A. Carroll

[57] ABSTRACT

An accumulator is divided by two diaphragms into two auxiliary fluid chambers forming an auxiliary gas chamber therebetween. The fluid chambers of two hydropneumatic suspension struts are connected to the respective auxiliary fluid chambers through a spool valve normally open for unrestricted fluid flow between the fluid chambers of the struts and their respective auxiliary fluid chambers. When one wheel hits a road hump or elevation, fluid from the affected strut flows into the respective auxiliary fluid chamber increasing the auxiliary gas chamber pressure which in turn is applied through the diaphragm to the other auxiliary fluid chamber causing fluid to flow therefrom into the respective strut to increase the effective length thereof. A sensor for sensing a large horizontal force exerted on the vehicle is connected to the valve spool closing the spool valve during a high speed turn when the horizontal force is sensed. The total volume of air available for absorbing the tendency of the vehicle to tilt is thus reduced to the volume of the gas chamber of the hydropneumatic strut affected, increasing the resistnace to tilting. In another embodiment, the spool valve is arranged to isolate the fluid chamber of each suspension strut also from a fluid pump and reservoir of a levelling device to prevent deterioration of driveability.

21 Claims, 4 Drawing Figures

VEHICLE SUSPENSION SYSTEM

This invention relates to vehicle suspension systems of the kind in which a source of fluid under pressure communicates with a pair of suspension struts the effective suspension lengths of which are automatically controlled independently of the load of the vehicle. The pair of suspension struts may be associated with the right or left front and rear wheels, or front or rear right and left wheels of the vehicle.

As is well known in the art, the vehicle suspension system functions to prevent the vehicle from excessively tilting in a transverse direction during curvilinear travel or in a longitudinal direction during acceleration or braking. However, since each suspension strut is arranged to dampen relative axial movements of the cylinder and the piston with a suitable time lag so as to obtain a smooth action of the strut even on a rough surface, then, if the vehicle is travelling in a sprawling fashion at high speeds, the time lag induces an undesired deterioration of driveability, which leads to the danger of the driver loosing control of the vehicle.

It is therefore an object of the present invention to provide an improved vehicle suspension system with a view to overcoming the above-stated disadvantage.

Another object of the present invention is to provide an improved vehicle suspension system in which the actual volume of gas available for absorbing a tendency to tilt is decreased during certain drive conditions such as a high-speed turn, acceleration or braking to increase resistance to rolling or pitching.

It is a further object of the present invention to provide an improved vehicle suspension system in which the fluid chamber of each suspension strut is isolated from a fluid pump and reservoir during the above-mentioned drive conditions so as to prevent deterioration of driveability.

These and other features will be readily apparent from the following description of embodiments of the invention when read in conjunction with the accompanying drawings, in which.

Figure 1:
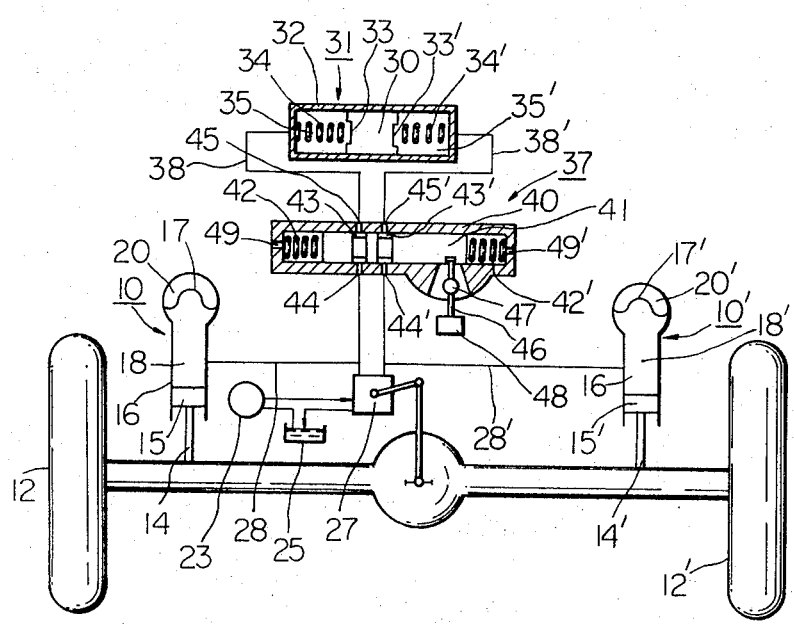
FIG. 1 is a schematic diagram showing an embodiment of the vehicle suspension system of the invention.

Referring now to FIG. 1, the suspension system as depicted includes two suspension struts 10 and 10' of prior art construction which are associated with the right and left wheels 12 and 12' of the vehicle, respectively. The suspension struts 10 and 10' comprise shock absorbers inclusing piston rods 14 and 14° which carry pistons 15 and 15' working in cylinders 16 and 16' and subjected on their upper surfaces to fluid under pressure, and hydropneumatic spring means are connected to the cylinders 16 and 16'. Diaphragm 17 and 17' separate fluid chambers 18 and 18' from gas chambers 20 and 20', respectively. A pump 23 is provided for supplying the system with hydraulic fluid under pressure and may be driven by the engine of the vehicle or any other convenient means such as an electric motor. The pump 23 is fed with hydraulic fluid from a reservoir 25 and pumps the hydraulic fluid to and from the fluid chambers 18 and 18' of the suspension struts 10 and 10' through a conventional levelling valve 27 and pipe lines 28 and 28'. The function of the levelling valve 27 is to control the flow of hydraulic fluid therethrough so as to maintain the effective lengths of the structs thereby maintaining a predetermined vehicle level.

In the suspension system shown in FIG. 1, the gas chambers 20 and 20' of the struts are constructed to be of considerably smaller volume than the ordinary one. In order to complement the volume, an auxiliary gas chamber 30 is provided within an accumulator 31 for cooperation with the gas chambers 20 and 20'. The accumulator 31 includes a housing 32, two diaphragm members 33 and 33' and two spring members 34 and 34' for urging the respective diaphragm members away from each other, the auxiliary gas chamber 30 being defined between the two diaphragm members 33 and 33'. The accumulator 31 also includes auxiliary fluid chambers 35 and 35' for the fluid chambers 18 and 18', the auxiliary fluid chambers 35 and 35' being defined between their associated diaphragm members 33 and 33' and the end walls of the housing 32. The fluid chamber 18 communicates with the auxiliary fluid chamber 35 through a spool valve 37 and a pipe line 38, and the fluid chamber 18' communicates with the auxiliary fluid chamber 35' through the spool valve 37 and a pipe line 38'.

The spool valve 37 includes a horizontally disposed cylinder 40, an axially movable spool 41 within the cylinder, and two spring members 42 and 42' for urging the spool in the opposite directions to resiliently hold it in a neutral position as shown. The spool 41 is provided with two annular grooves 43 and 43' in axially spaced relationship through which ports 44 and 44', connected respectively to the fluid chambers 18 and 18', communicate with ports 45 and 45', connected respectively to the auxiliary fluid chambers 35 and 35', when the spool 41 is held in the neutral position. The spool valve 37 further includes sensing means for sensing a horizontal component of force exerted on the body of the vehicle. In this embodiment, the sensing means comprises a weight 48 secured to the lower end of a lever 46 pivotally mounted on a pin 47 secured on the cylinder 40. The upper end of the lever 46 is operatively connected with the spool 41 so that rotation of the lever moves the spool in its axial direction.

The cylinder 40 is formed in the end surfaces thereof with orifices 49 and 49', so that the resistance to the flow of air through the orifices imposes a drag on spool movement, thus quickly dampening spool oscillations.

With the arrangement as described and shown in FIG. 1, when the vehicle is travelling without being subjected to any horizonted component of force, the spool 41 is held in the neutral position and accordingly the auxiliary fluid chambers 35 and 35' are kept in communication with the corresponding fluid chambers 18 and 18' through the spool valve 37. It follows that both the gas chambers 20 and 20' and the auxiliary gas chamber 30 cooperate to absorb road shocks. Thus, it will be appreciated that the overall "spring constant" of the suspension struts 10 and 10' is maintained at a low value, providing satisfactorily a smooth ride.

If, in this condition, one wheel passes over a hump or an elevation, the degree of tilt of the vehicle can be minimized, since compression of the suspension strut for the one wheel will cause fluid to flow into the respective auxiliary fluid chamber in turn causing an increase in the pressure within the auxiliary gas chamber 30, which pressure is transmitted through the opposite diaphragm member to the opposite auxiliary fluid chamber forcing fluid to flow into the respective main fluid chamber, thereby causing the opposite suspension strut to extend.

When, on the other hand, the vehicle is subjected to a large horizontal component of force as during a high-speed turn, the centrifugal force acting on the weight 48 causes axial movement of the spool 41, blocking the communications between the ports 44 and 45 and the ports 44' and 45'. Since, in this condition, only the gas chambers 20 and 20' are working, the overall spring constant of the suspension struts 10 and 10' is increased, with a resulting increase in resistance to rolling. Thus, it will be understood that the extent of rolling of the vehicle can be considerably reduced.

Figure 2:
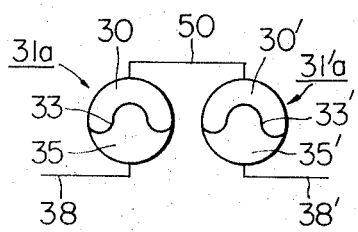
FIGS. 2 and 3 show in part other forms of the invention.
Figure 3:
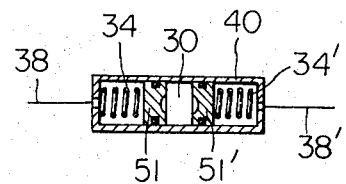

In FIG. 2, there is shown in part another form of the accumulator means employed in the system of the present invention. The accumulator means comprises two units 31a and 31a', which include auxiliary fluid chambers 35 and 35' and auxiliary gas chambers 30 and 30', the auxiliary fluid and gas chambers being divided by diaphragm members 33 and 33', respectively. These accumulator units 31a and 31a' are connected in series with each other by a pipe line 50 communicating with the auxiliary gas chambers 30 and 30'. FIG. 3 shows a further form of the accumulator means which is different from that of FIG. 1 in that two pistons 51 and 51' are provided within the cylindrical housing 40 in place of the diaphragm members 33 and 33'. These two forms of the accumulator means operate in a similar manner to that shown in FIG. 1.

Figure 4:
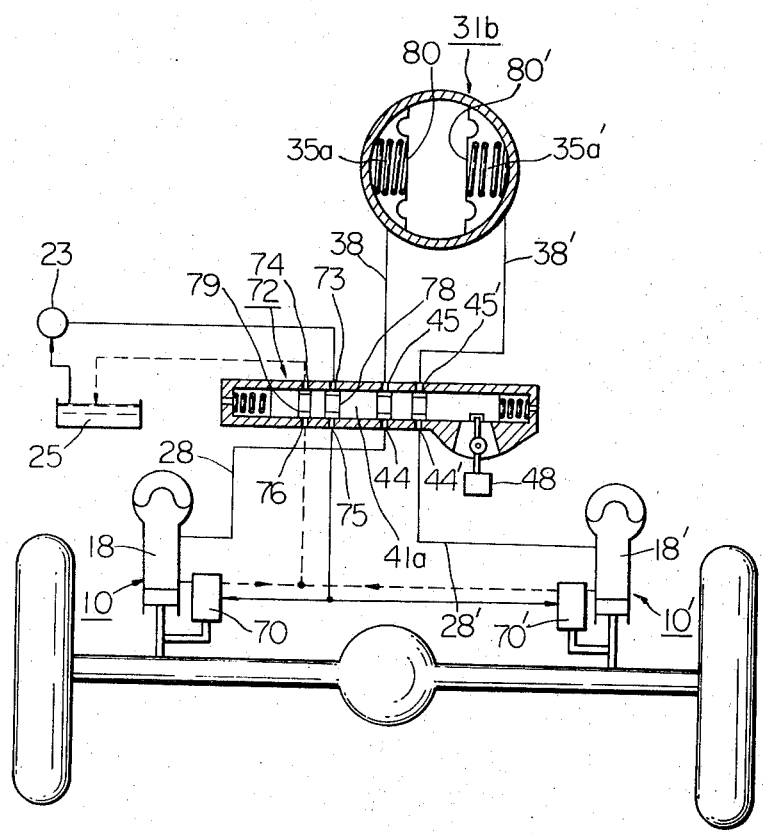
FIG. 4 is a schematic diagram of an embodiment of the vehicle suspension system in which a fluid chamber of each suspension unit is isolated from the fluid pump and reservoir during certain drive conditions.

In FIG. 4, another, embodiment of the present invention is shown wherein like reference numerals indicate like parts or components of FIG. 1. The suspension system includes levelling valves 70 and 70' connected with the suspension struts 10 and 10'. Each of the levelling valves 70 and 70' is responsive to relative movements of the cylinder and piston of the respective strut to control the pumping of hydraulic fluid to and from the fluid chambers 18 and 18'. In this embodiment, the inlets of the levelling valves 70 and 70' communicate with the pump 23 through a spool valve 72, and the outlets thereof communicate with the reservoir 25 through the same spool valve 72. The spool valve 72 is constructed to have a similar cylinder and spool as the spool valve 37 of FIG. 1 has, and includes a port 73 connected to the pump 23, a port 74 connected to the reservoir 25, and ports 75 and 76 connected respectively to the inlet ports and outlet ports of the levelling valves 70 and 70'. The ports 73 and 75 communicate with each other through an annular groove 78 formed in the spool 41a, and also the ports 74 and 76 communicate with each other through an annular groove 79 formed in the spool 41a. The accumulator means 31b in this embodiment is of a different shape and the auxiliary fluid chambers 35a and 35a' are formed with diaphragm members 80 and 80'. The communications between chambers 18 and 35a as well as between 18' and 35a' are the same as in FIG. 1 embodiment.

The operation of the suspension system of FIG. 4 is as follows: When the vehicle is subjected to a large transverse or horizontal component of force as during a high-speed turn, the spool 41a is moved in the axial direction by the centrifugal force applied on the weight 48, thereby blocking the communications between the fluid chamber 18 and the auxiliary fluid chamber 35a and between the fluid chamber 18' and the auxiliary fluid chamber 35a'. Simultaneously, the spool valve 72 blocks the feed of hydraulic fluid from the pump 23 to the fluid chambers 18 and 18' and also blocks the discharge of hydraulic fluid from the fluid chambers 18 and 18' to the reservoir 25. Thus, it will be understood that not only is the resistance to rolling increased, but also the danger of the driver loosing control of the vehicle during a high-speed turn is eliminated because the levelling valves 70 and 70' of the suspension system are, isolated.

Although description has been made with the embodiment of the invention in which the two suspension struts are associated with front or rear right and left wheels, it should be understood that the invention is equally applicable to front and rear suspension units, in which case the extent of pitching can be minimixed during acceleration and braking. Furthermore, suspension units are preferably provided for each wheel.

As has been described above, the present invention provides an improved vehicle suspension system characterized in that the actual volume of the gas available to each suspension strut is varied to provide for increased resistance to rolling or pitching during a high-speed turn, acceleration or braking but without detriment to the riding qualities during normal drive conditions. Furthermore, it will be apparent that according to another feature of the present invention the levelling valves of the suspension system are isolated during a high-speed turn so as to prevent deterioration of driveability, thus eliminating the danger of the driver loosing control of the vehicle.

What is claimed is:

1. In a vehicle suspension system of the strut type, comprising first and second suspension struts having cylinders formed therein with fluid chambers filled with pressurized fluid and pistons slidably accommodated in said cylinders and provided with piston rods, hydropneumatic spring means connected to said cylinders and having gas chambers, and levelling means having a fluid pump fed from a fluid reservoir to pump fluid under pressure through at least one levelling valve responsive to the vehicle level and arranged to communicate with said fluid reservoir and first and second suspension struts to automatically maintain the effective lengths of said suspension struts constant independently of the load of the vehicle; the improvement comprising accumulator means having two auxiliary fluid chambers and at least one auxiliary gas chamber formed therebetween; normally open valve means connected to and between the two auxiliary fluid chambers and the respective fluid chambers of said first and second suspension struts; and sensor means for sensing a horizontal component of force exerted on the vehicle said sensor means being operatively connected to said valve means to close said valve means to isolate said two auxiliary fluid chambers of said accumulator means from said respective fluid chambers of said first and second suspension struts in response to exertion of said horizontal component of force being sensed, in which the accumulator means includes a cylinder, two pistons slidably mounted within the cylinder, and two spring members for urging the respective pistons away from each other, the auxiliary gas chamber being defined between the two pistons.

2. In a vehicle suspension system of the strut type, comprising first and second suspension struts having cylinders formed therein with fluid chambers filled with pressurized fluid and pistons slidably accommodated in said cylinders and provided with piston rods, hydropneumatic spring means connected to said cylinders and having gas chambers, and levelling means having a fluid pump fed from a fluid reservoir to pump fluid under pressure through at least one levelling valve responsive to the vehicle level and arranged to communicate with said fluid reservoir and first and second suspension struts to automatically maintain the effective lengths of said suspension struts constant independently of the load of the vehicle; the improvement comprising accumulator means having two auxiliary fluid chambers and at least one auxiliary gas chamber formed therebetween; normally open valve means connected to and between the two auxiliary fluid chambers and the respective fluid chambers of said first and second suspension struts; and sensor means for sensing a horizontal component of force exerted on the vehicle, said sensor means being operatively connected to said valve means to close said valve means to isolate said two auxiliary fluid chambers of said accumulator means from said respective fluid chambers of said first and second suspension struts in response to exertion of said horizontal component of force being sensed, in which the accumulator means includes a housing, two diaphragm members, and two spring members for urging the respective diaphragm members away from each other, the auxiliary gas chamber being defined between the two diaphragm members, in which the accumulator means includes first and second auxiliary fluid chambers defined within the housing on the sides of their associated diaphragm members opposite to the auxiliary gas chamber, in which the normally open valve means comprises a horizontally disposed valve cylinder; and axially movable spool within the valve cylinder; and two spring members for urging the spool in the opposite directions to resiliently hold it in a neutral position, the valve cylinder having a first port connected to the fluid chamber of the first suspension strut, a second port connected to the first auxiliary fluid chamber of the accumulator means, a third port connected to the fluid chamber of the second suspension strut and a fourth port connected to the second auxiliary fluid chamber of the accumulator means, the spool having first and second annular grooves formed therein, the first and second annular grooves providing communications between the first and second ports and between the third and fourth ports when the spool is held in the neutral position.

3. A system as claimed in claim 2, in which the sensor means comprises a weight mounted on one end of a lever pivotally mounted on the valve cylinder and having the other end operatively connected with the spool.

4. In a vehicle suspension system of the strut type, comprising first and second suspension struts having cylinders formed therein with fluid chambers filled with pressurized fluid and pistons slidably accommodated in said cylinders and provided with piston rods, hydropneumatic spring means connected to said cylinders and having gas chambers, and levelling means having a fluid pump fed from a fluid reservoir to pump fluid under pressure through at least one levelling valve responsive to the vehicle level and arranged to communicate with said fluid reservoir and first and second suspension struts to automatically maintain the effective lengths of said suspension struts constant independently of the load of the vehicle; the improvement comprising accumulator means having two auxiliary fluid chambers and at least one auxiliary gas chamber formed therebetween; normally open valve means connected to and between the two auxiliary fluid chambers and the respective fluid chambers of said first and second suspension struts; and sensor means for sensing a horizontal component of force exerted on the vehicle, said sensor means being operatively connected to said valve means to close said valve means to isolate said two auxiliary fluid chambers of said accumulator means from said respective fluid chambers of said first and second suspension struts in response to exertion of said horizontal component of force being sensed, in which the valve means is arranged to isolate the at last one levelling valve from the fluid pump and the fluid reservoir in response to the horizontal component of force being sensed, in which the valve cylinder includes a fifth port connected to the fluid pump, a sixth port connected to an inlet of the at least one levelling valve, a seventh port connected to an outlet of the at least one levelling valve and an eight port connected to the fluid reservoir, the spool having third and fourth annular grooves formed therein, the third and fourth annular grooves providing communications between the fifth and sixth ports and between the seventh and eighth ports when the spool is held in the neutral positions.

5. A hydropneumatic suspension system for a motor vehicle having a body and wheel supporting means, comprising first and second suspension struts each of which is mounted between said vehicle body and said wheel supporting means and has a chamber filled with pressurized hydraulic fluid, each of said suspension struts being retractable and extensible in response to relative movement between said vehicle body and said wheel supporting means to increase and reduce, respectively, the pressure of the hydraulic fluid in the corresponding chamber, a hydraulic fluid pressure source and a hydraulic fluid reservoir fluidly communicable with said chambers of said suspension struts to supply and discharge hydraulic fluid into and from, respectively, said chambers thereby maintaining the height of said vehicle body substantially constant independently of the load of said vehicle, levelling means disposed between said chambers and said source and between said chambers and said reservoir to control fluid communication therebetween and responsive to increases and reductions of the load of said vehicle to establish said fluid communication between said chambers and said source and between said chambers and said reservoir, an accumulator including a casing having therein first and second hydraulic fluid chambers, a gas chamber defined therebetween and filled with pressurized gas, and first and second partition members separating said first and second hydraulic fluid chambers, respectively, from said gas chamber, said first and second hydraulic fluid chambers of said accumulator communicating respectively with said chambers of said first and second suspension struts, each of said partition members being responsive to the difference between the fluid pressures in said hydraulic fluid chambers of said accumulator to move toward one of said hydraulic fluid chambers of said accumulator in which one the fluid pressures is lower, valve means disposed between said chambers of said suspension struts and the corresponding hydraulic fluid chambers of said accumulator to control therebetween, and means operatively connected to said valve means and responsive to a horizontal component of force exerted on said vehicle to actuate said valve means to isolate said chambers of said suspension of said accumulator.

6. A system as claimed in claim 5, in which the first and second suspension struts operatively cooperate with the front right and left wheels of the vehicle, respectively.

7. A system as claimed in claim 5, in which the first and second suspension struts operatively cooperate with the rear right and left wheels of the vehicle, respectively.

8. A system as claimed in claim 5, in which the first and second suspension struts operatively cooperate with the left front and rear wheels of the vehicle, respectively.

9. A system as claimed in claim 5, in which the first and second suspension struts operatively cooperate with the right front and rear wheels of the vehicle, respectively.

10. A hydropneumatic suspension system as claimed in claim 5, in which said accumulator further includes two biasing means for urging said partition members toward each other.

11. A hydropneumatic suspension system as claimed in claim 10, in which each of said partition members is a flexible diaphragm member deformably mounted in said casing.

12. A hydropneumatic suspension system as claimed in claim 10, in which said casing is a cylinder, and in which each of said partition members is a piston slidably mounted in said cylinder.

13. A hydropneumatic suspension system as claimed in claim 5, in which said gas chamber comprises first and second gas chambers spaced from and communicating with each other said casing comprises first and second casings spaced from and connected with each other, said first and second casings having therein said first hydraulic fluid chamber, gas chamber and partition member and said second hydraulic fluid chamber, gas chamber and partition member, respectively, said first and second partition members separating said first and second hydraulic fluid chambers from said first and second gas chambers, respectively.

14. A hydropneumatic suspension system as claimed in claim 13, in which each of said partition members is a flexible diaphragm member deformably mounted in the corresponding casing.

15. A hydropneumatic suspension system as claimed in claim 5, in which said valve means comprises a horizontal disposed value cylinder, an axially slidable valve spool within said valve cylinder, and two biasing means for urging said spool in opposite directions to resiliently hold the same in a neutral position, said valve cylinder having formed therein a first port communicating with said chamber of said first suspension strut, a second port communicating with said first hydraulic fluid chamber of said accumulator a third port communicating with said chamber of said second suspension strut, and a fourth port communicating with said second hydraulic fluid chamber of said accumulator, said spool having formed therein first and second annular grooves, said first and second annular grooves providing fluid communication between said first and second ports and between said third and fourth ports when said spool is held in said neutral position.

16. A hydropneumatic suspension system as claimed in claim 15, in which said means responsive to a horizontal component of force exerted on said vehicle comprises a lever pivotally mounted on said valve cylinder and operatively connected at one end thereof with said spool and a weight mounted on the other end of said lever.

17. A hydropneumatic suspension system as claimed in claim 5, further comprising second valve means integral with said first valve means and disposed between said levelling means and said source and between said levelling means and said reservoir to control fluid communication therebetween, said second valve means isolating said levelling means from said source and said reservoir when said first valve means is actuated.

18. A hydropneumatic suspension system as claimed in claim 17, in which said integral first and second valve means comprises a horizontally disposed valve cylinder, an axially slidable valve spool within said valve cylinder, and two biasing means for urging said valve spool in opposite directions to resiliently hold the same in a neutral position, said valve cylinder having formed therein a first port communicating with said chamber of said first suspension strut, a second port communicating with said first hydraulic fluid chamber of said accumulator, a third port communicating with said chamber of said second suspension strut, a fourth port communicating with said second hydraulic fluid chamber of said accumulator, a fifth port communicating with said source, a sixth port communicating with an inlet of said levelling means, a seventh port communicating with said reservoir, and an eight port communicating with an outlet of said levelling means, said spool having formed therein first, second, third and fourth annular grooves, said first and second annular grooves providing fluid communication between said first and second ports and between said third and fourth ports when said spool is held in said neutral position, said third and fourth annular grooves providing fluid communication between said fifth and sixth ports and between said seventh and eight ports when said spool is held in said neutral position.

19. A hydropneumatic suspension system as claimed in claim 18, in which said means responsive to a horizontal component of force exerted on said vehicle comprises a lever pivotally mounted on said valve cylinder and operatively connected at one end thereof with said spool and a weight mounted on the other end of said lever.

20. A hydropneumatic suspension system as claimed in claim 5, in which each of said suspension struts includes a cylinder connected to one of said vehicle body and said wheel supporting means, a piston slidably mounted in said cylinder and defining said chamber of said suspension strut therein, and a piston rod connected to said piston and to the other of said vehicle body and said wheel supporting means.

21. A hydropneumatic suspension system as claimed in claim 5, further comprising first and second hydropneumatic spring means each of which includes a casing and a flexible partition member dividing the interior of said casing into a gas chamber filled with pressurized gas and a hydraulic fluid chamber filled with pressurized fluid, said hydraulic fluid chambers of said hydropneumatic spring means communicating respectively with said chambers of said suspension struts.

* * * * *